United States Patent [19]

Parsons et al.

[11] Patent Number: 4,865,064
[45] Date of Patent: Sep. 12, 1989

[54] HINGE APPARATUS

[76] Inventors: Thomas O. Parsons, P.O. Box 475, Oak Creek, Colo. 80467; Kenneth C. Thompson, 2823 S. Pagosa St., Aurora, Colo. 80013; Michael S. Kent, 12267 E. Bates Cir., Aurora, Colo. 80222

[21] Appl. No.: 217,048

[22] Filed: Jul. 8, 1988

Related U.S. Application Data

[63] Continuation of Ser. No. 39,453, Jul. 8, 1988, abandoned.

[51] Int. Cl.⁴ ............................................. A61H 3/02
[52] U.S. Cl. ...................................... 135/68; 135/74; 403/102
[58] Field of Search .................... 135/65, 66, 68, 69, 135/70, 71-86; 272/70-74; 403/53, 72, 100, 102, 291-297; 215/355

[56] References Cited

U.S. PATENT DOCUMENTS

| | | | |
|---|---|---|---|
| 39,854 | 9/1863 | Wemple | 135/50 |
| 49,916 | 9/1865 | Perry et al. | 215/355 |
| 252,008 | 1/1882 | Andrews | 403/83 |
| 595,637 | 12/1897 | Kuhnke | 135/50 |
| 1,036,222 | 8/1912 | Griffenberg | 403/102 |
| 1,241,815 | 10/1917 | Blackard | 135/50 |
| 1,285,120 | 11/1918 | Gillett | 135/72 |
| 2,264,015 | 11/1941 | Bennett | 135/69 |
| 2,441,689 | 7/1946 | Daniel | 135/46 |
| 2,484,406 | 9/1947 | Gibson | 135/50 |
| 2,649,104 | 8/1953 | Militano | 135/46 |
| 3,489,157 | 1/1970 | Pearlstine | 135/74 |
| 3,655,297 | 4/1972 | Bolen, Jr. et al. | 416/72 |
| 3,669,133 | 6/1972 | Hyman | 135/45 |
| 3,886,962 | 6/1975 | Diamontis | 135/49 |
| 4,184,503 | 1/1980 | Nakajima | 135/68 |
| 4,253,478 | 3/1981 | Huss | 135/68 |
| 4,437,480 | 4/1984 | Huss | 135/74 |
| 4,527,579 | 7/1985 | Knotter et al. | 135/74 |
| 4,642,931 | 2/1987 | Flores | 403/100 |

Primary Examiner—Robert A. Hafer
Assistant Examiner—Charles H. Sam
Attorney, Agent, or Firm—Klaas & Law

[57] ABSTRACT

A hinge apparatus for coupling the component parts of a foldable device is provide. The hinge apparatus comprises a moveable sleeve adapted to tightly fit a guide and stop bushing operably connected with the support components of the foldable device. With the foldable device is in the use extended position, the moveable sleeve may surround and provide support to a hinge link. The hinge link is adapted to permit folding of the foldable device when the moveable sleeve is not surrounding the hinge link. A folding crutch comprising the hinge apparatus is provided. The folding crutch, comprising the hinge apparatus, provides the crutch user with safe, firm and sure support.

11 Claims, 2 Drawing Sheets

HINGE APPARATUS

This application is a continuation of application Ser. No. 039,453, filed July 8, 1988, now abandoned.

FIELD OF THE INVENTION

In one aspect, this invention relates to a hinge device. In another aspect, this invention relates to folding crutch incorporating a hinge device of this invention.

BACKGROUND OF THE INVENTION

Various designs of hinges for use with folding apparatus are known in the art. U.S. Pat. No. 3,655,297 to Bolen, Jr. et al is typical of prior art hinges used for coupling foldable tubular parts, such as the handle of a foldable paddle. U.S. Pat. No. 3,669,133 to Hyman describes a collapsable rod that uses a cord for a joint coupling device adapted to be used with a hollow, foldable cane. U.S. Pat. No. 4,527,579 to Knotter et al. describes a foldable cane joined by pairs of hinge links having spring loaded locking sleeves. Prior art hinges do not provide a rigid, stable and safe locked joint for the foldable apparatus when the apparatus comprising the hinge is positioned for use. Prior art hinges allow the foldable device to shake and wobble when used.

A folding crutch, comprising a hinge apparatus and hinged joints, is useful to provide a means of storing or transporting a crutch when the crutch is not in use.

Numerous disclosures of folding crutch structures and related hinge apparatus have been made in attempts for useful crutch designs. For example, U.S. Pat. No. 39,854 to Wemple (1863) relates to a folding crutch for traveling or storage and having spurs on the end of the crutch to give traction on slick surfaces and a shock absorption mechanism. U.S. Pat. No. 595,637 to Kuhnke (1897) relates to a folding crutch which uses oblong plates located on the inside of each crutch pole with longitudinal slots to allow movement of the crutch sections so that the upper and lower sections can be folded flat against each other. U.S. Pat. No. 1,241,815 to Blackard (1917) relates to a folding crutch, the operation of which is attributed to two one-pivot hinges located on each of the main crutch supports and a latch on the outside of each crutch support which locks each joint in the vertical position with a snapping action. U.S. Pat. No. 2,484,406 to Gibson (1947) relates to a folding crutch having a single elongated bottom leg, attached to the main part of the crutch by means of a pivotal pin which makes its possible to fold the crutch by folding only one joint. U.S. Pat. No. 3,886,962 to Diamontis (1975) relates to a folding crutch having a pivot pin and spring loaded mechanism which enable the user to lock the crutch in position with one hand. U.S. Pat. No. 4,184,503 to Nakajima (1980) relates to a folding crutch having folding joints integrated into crutch prongs which prevent the crutch from rotating more than 180 degrees. U.S. Pat. No. 4,253,478 to Huss (1981) relates to a folding crutch and a mechanism for tightening and reinforcing the joint of a folding crutch which mechanism includes a spring loaded device that permits folding hinges to slide from a hidden and ridged position to a open and folding position.

There is a continuing need for a folding crutch, comprising a hinge apparatus, having a sturdy design and providing safe, firm and sure support for the crutch user.

SUMMARY OF THE INVENTION

It is an object of this invention to provide a hinge apparatus. It is another object of this invention to provide a folding crutch comprising a hinge apparatus. A further object of this invention is to provide a folding crutch, comprising a hinge apparatus, that provides the crutch user with safe, firm and sure support. A still further object of this invention is to provide a folding crutch that has a simple but sturdy design that permits relatively low cost production.

These and other objects, embodiments, details, features and advantages of this invention will become apparent to those skilled in the art from the following detailed description, the appended claims and the drawings in which:

Figure 1:
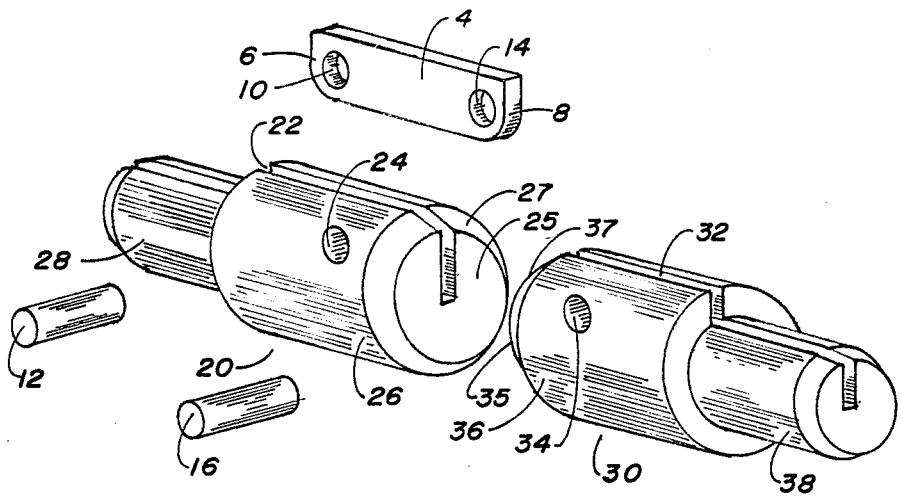
FIG. 1 shows an exploded view of one variation of a portion of a hinge apparatus of this invention.

We have discovered a new hinge apparatus. We have also discovered a new folding crutch comprising a hinge apparatus. We have found a hinge mechanism for a folding device such as a crutch which permits secure and firm support to the user of the device when the device is extended for use. We have also discovered a hinge mechanism for a folding crutch that permits the crutch to be folded easily.

DESCRIPTION OF THE PREFERRED EMBODIMENTS

In accordance with a first embodiment of this invention, a hinge apparatus is provided.

The hinge apparatus of this invention is useful for coupling a foldable device. The folding device can be a cane, a crutch, a tent support member, and other items which are useful in an extended and rigid position and are stored, carried or otherwise used in a different manner in a folded position.

The hinge apparatus of this invention comprises a portion of a foldable device comprising a first end section comprising an attachment zone and a second end section comprising an attachment zone. The hinge apparatus comprises a hinge link means connected to a first hinge end piece by a first hinge link pin and connected to a second hinge end piece by a second hinge link pin. Preferably the hinge link means comprises a first end and a second end and a first hinge link pin hole adapted to receive the first hinge link pin and a second hinge link pin hole adapted to receive the second hinge link pin.

The first hinge end piece is preferably adapted for attachment to the attachment zone of the first end section of the foldable device. The first hinge end piece further comprises a hinge link means cavity adapted to receive the first end of the hinge link means and comprises a hinge link pin hole adapted to receive the first hinge link pin.

The second hinge end piece is preferably adapted for attachment to the attachment zone of the second end section of the foldable device. The second hinge end piece comprises a hinge link means cavity adapted to receive the second end of the hinge link means and comprising a hinge link pin hole adapted to receive the second hinge link pin.

The hinge apparatus further comprises a securing means for securing the first hinge end piece to the attachment zone of the first end section of the foldable device, and the hinge apparatus comprises a securing means for securing the second hinge end piece to the attachment zone of the second end section of the foldable device.

An elongated moveable sleeve guide bushing is operably connected to the first end section of the foldable device. An elongated moveable sleeve stop bushing is operably connected to the second end section of the foldable device. The hinge apparatus further comprises an elongated hollow moveable sleeve.

When the hinge apparatus of the foldable device is in the use extended position, the second end of the hollow moveable sleeve is operably moveable, over the first end section of the foldable device, over the moveable sleeve guide bushing, over the first hinge end piece, over the second hinge end piece, and over the moveable sleeve stop bushing, to a rigid use position determined by the contact of the moveable sleeve with the moveable sleeve stop bushing and the moveable sleeve guide.

When the hinge is folded, the moveable sleeve means is moved to a point above the second hinge end piece and above the first hinge end piece. The hinge link means is free to move within or from the hinge link cavity. The hinge can be folded in numerous positions.

In another variation of this embodiment of this invention, the moveable sleeve preferably has a length sufficient to surround the first hinge end piece and the second hinge end piece. The moveable sleeve stop means is adapted to stop the movement of the moveable sleeve at a position over the first hinge end piece and the second hinge end piece. In still another variation, the moveable sleeve has a length sufficient to surround the first hinge end piece, the second hinge end piece, a portion of the moveable sleeve guide and a portion of the moveable sleeve stop means.

In a still more preferred variation, the moveable sleeve guide bushing and the moveable sleeve stop bushing can be made of composition which permits the bushing to fit tightly within the moveable sleeve. It is preferred that the bushings be made from a rigid plastic material. The rigid plastic material can be a rigid polypropylene, polyethylene, polyester, nylon, or other rigid plastic material known in the art. The bushings can also be made of rubber compounds, wood, and any other material which permits the sleeve to seat firmly upon the bushings In a preferred variation of this embodiment of this invention, the moveable sleeve guide bushing has a length $L_1$ and has an external dimension $D_1$. The moveable sleeve stop bushing preferably has a length $L_2$ and has a first end and a second end and has a first external dimension $D_2$ at the first end and a second external dimension $D_3$ at the second end, wherein the dimension $D_3$ is greater than the dimension $D_2$. The moveable sleeve preferably has a length $L_3$ and comprises a first end having an internal dimension $D_4$ and second end having an internal dimension $D_5$, wherein the dimension $D_4$ is substantially the same as dimension $D_1$ and the dimension $D_4$ is less than the dimensions $D_2$, $D_3$, and $D_5$, and wherein the dimension $D_5$ is greater than the dimensions $D_1$, $D_2$, $D_3$ and $D_4$, and wherein length $L_3$ is greater than length $L_1$ plus $L_2$.

In one preferred variation of this embodiment of this invention, the hinge end piece comprises an elongated link cavity adapted for insertion of a portion of the elongated hinge link means. The hinge end piece also preferably comprises a curved or contoured end surface which permits the hinge assembly to bend in the direction of the contour. The contoured surface is preferably located at the top portion of the hinge link cavity, at the exterior end of the hinge end piece which end is opposite the end of the hinge end piece which is attached to the attachment zone of the end section of the foldable device.

In another variation of this embodiment of this invention, the hinge end piece of the hinge apparatus of this invention comprises a substantially cylindrical first segment. The first segment comprises a first end and a second end. The first end is adapted for receipt of the hinge link means. The first segment also comprises a hinge link means cavity and a pin hole or pin cavity. The first end of the first segment comprises a contoured surface edge located at the outer perimeter of the first end of the first segment and the outer end of the link cavity. In one variation, the contour of the contoured surface is such that the ratio of the length of the lowest point of contour along the surface of the first segment hinge end piece to the longest surface of the first segment is in the range of about 0.92 to 0.98. In another preferred variation of this embodiment, the first segment of the hinge end piece has a base diameter in the range of about 0.70 to about 0.78 inches and a height in the range of about 0.70 to about 0.78 inches. The first segment comprises a pin cavity for the hinge link pin said pin cavity having a diameter in the range of about 0.177 to about 0.197 inches. An elongated hinge link cavity extends from the first end of the hinge end piece and comprises a length in the range of about 0.57 to 0.63 inches and a width in the range of about 0.124 to 0.136 inches and a height in the range of about 0.36 to 0.44 inches. The hinge cavity preferably comprises a curved end section near the second end of the first segment of the hinge end piece. This curved section is adapted to permit movement of an elongated hinge link from a first link position within the link cavity wherein the surface of the elongated portion of the hinge link are parallel to the outside surface of the first segment to a second link position wherein the link is not within the cavity. In a still more preferred variation, the link pin hole positioned wherein the pin hole intersects perpendicularly with the hinge cavity a point that is defined by the center of the pin hole being in the range of about 0.32 to about 0.36 inches from the first end of the first segment and in the range of about 0.22 to 0.26 inches from the outside surface of the hinge end piece. In another variation, the hinge piece further comprises a substantially cylindrical second segment having a first end and a second end, wherein the diameter of the base of the second segment of the hinge end piece is less than the diameter of base of the first segment of the hinge end piece. The first end of the second segment is operably connected to the second end of the first segment. Preferably the second segment of the hinge piece of this variation has a base diameter in the range of about 0.62 to about 0.69 inches. More preferably the second segment of the hinge piece of this variation has a height in the range of about 0.71 to about 0.79 inches. In still another variation, the hinge piece comprises a substantially frustoconical shaped third segment having a first end and a second end, the first end being the base of the frustum and the second end being the top of the frustum, wherein the diameter of the base of the third segment of the hinge end piece is substantially equal to the diameter of the base of the second segment of the hinge end piece. The first end of the third segment is operably connected to the second end of the second segment. Preferably the frustoconical third segment of the hinge piece of this variation has a ratio of top diameter to base diameter in the range of about 0.97 to about 0.99 inches. More preferably the third segment of the hinge piece of this variation has a height in the range of about 0.23 to about 0.27 inches. In a still more preferred variation of this embodiment, the hinge means comprises a hinge link having a length sufficient to connect two hinge end pieces wherein the hinge link comprises two pin holes each having a diameter equal to the diameter of matching pin holes of the hinge end pieces. In one variation, a preferred hinge link has a length equal to about 0.92 to 0.95 of two times the length of the hinge link cavity of a hinge end piece and a width equal to about 0.93 to 0.97 times the width of the hinge link cavity and a height equal to the depth of the hinge link cavity. The hinge link can also comprise one straight side and one side with two contoured surfaces at each end of the hinge link. The hinge link may comprise two curved ends. The contour or curvature of the curved portions of the hinge link preferably match the contour or curved end sections of the hinge link cavities in the first segments of the hinge end pieces.

In one variation of this embodiment of this invention, a filler is used between the attachment zone of the end section of the foldable device and hinge end piece. We have discovered that voids or cavities result from an imperfect fit of the hinge end pieces within the attachment zones of the end sections of the foldable device. The imperfect fit may result from tube ovality when the foldable device comprises a tube support means. The filler can compensate for the imperfect fit. The filler prevents the foldable device from shaking or wobbling when the foldable device is in the extended use position. We have found that if these voids or cavities are left open or hollow the hinge end pieces may move within the end sections of the foldable device. The foldable device may be unstable when used. The filler may be any filler material known in the art.

In another variation of this embodiment of this invention, the hinge end pieces are secured to the attachment zones of the end sections of the foldable device by the use of a chemical adhesive means. Preferably this chemical adhesive means also acts as a filler to compensate for end section and hinge end piece imperfect fit, including tube ovality. Many adhesives known in the art are acceptable, including cyanoacrylate esters, epoxy resin adhesives and other binding agents apparent to those skilled in the art.

In another variation of this embodiment of this invention, the hinge end pieces are secured to the attachment zones of the end sections of the foldable device by screw threading, such as female screw threading, alternatively, of the attachment zones of the end sections of foldable device or the hinge end pieces and providing the attachment zones or the hinge end pieces with male counterpart screw means.

In still another variation of this embodiment of this invention, the hinge end pieces are secured to the attachment zones of the end sections of the foldable device by the use of a mechanical connection means such as a pop rivit, screw, bolt and nut combination and other connection means known in the art.

In accordance with a another embodiment of this invention, a folding crutch comprises a top crutch portion, a bottom crutch portion, and a hinge apparatus.

The top crutch portion comprises an underarm hold means having a first end and a second end, a handle means having a first end and a second end, a first top support member and a second top support member. The first top support member and the second top support member each comprise a first end section and a second end section The first end section of the first top support member is operably connected to the first end of the underarm hold means and the first end section of the second top support member is operably connected to the second end of the underarm hold means. At a point below the underarm hold means, the first top support member is operably connected to the first end of the handle means and the second top support member is operably connected to the second end of the handle means. The second end section of the first top support member comprises an attachment zone. The second end section of the second top support member also comprises an attachment zone.

The bottom crutch portion comprises an bottom stop means, a brace means having a first end and a second end, a first bottom support member and a second bottom support member. The first bottom support member and the second bottom support member each comprise a first end section and a second end section. The first end section of the first bottom support member is operably connected to the bottom stop means and the first end section of the second bottom support member is also operably connected to the bottom stop means. At a point above the bottom stop means, the first bottom support member is operably connected to the first end of the brace means and the second bottom support member is operably connected to the second end of the brace means. The second end section of the first bottom support member comprises an attachment zone. The second end section of the second bottom support member also comprises an attachment zone.

Hinge apparatus connects the top crutch portion with the bottom crutch portion. The hinge means provides alternative crutch positions. The positions include a use extended and secure position wherein the first top support member is axially aligned with the first bottom support member and the second top support member is axially aligned with the second bottom support member and the top support members have positions that are fixed in relation to the positions of the bottom support members. The positions also include a nonuse folded position wherein the top support members and the bottom support members are not axially aligned and do not have fixed relative positions.

The folding crutch comprises a hinge apparatus of this invention. In one variation, the folding crutch comprises two hinge apparatus, one hinge apparatus coupling the first top support member with the first bottom support member and one hinge apparatus coupling the second top support member with the second bottom support member. In another variation, the brace means of the folding crutch comprises a hinge apparatus of this invention.

When the folding crutch is to be extended for use, the user places the first top support member in axial alignment with the first bottom support member and places the second top support member in axial alignment with the second bottom support member. The hinge links of the hinge apparatus then become inserted into the hinge link cavities of the end pieces. The user then moves each moveable sleeve over the hinge end pieces to a position determined by the moveable sleeve stop means. The moveable sleeves prevent the hinge links from moving from the hinge cavities and maintain the crutch in a rigid, usable position.

In a folding crutch of this invention, the relative location of the pin cavities of the hinge end pieces and the dimensions of the hinge link and hinge link cavities of the hinge end pieces are such that the folding crutch can be folded in only one direction. The direction of folding is the direction the hinge link moves from the hinge link cavity.

Further additional embodiments of this invention are shown in the drawings in which FIG. 1 shows an exploded view of a portion of a hinge apparatus of this invention.

A hinge link means 4 comprises a first end 6 and a second end 8. The hinge link means 4 also comprises a first hinge link pin hole 10 adapted to receive a first hinge link pin 12 and a second hinge link pin hole 14 adapted to receive a second hinge link pin 16.

A first hinge end piece 20 comprises a first end 26 and a second end 28. The first end 26 comprises a cavity 22 adapted to receive the first end 6 of the hinge link means 4 and comprises a pin hole 24 adapted to receive the first hinge link pin 12. The first end 26 also comprises a tapered zone 27 and a substantially flat head 25. The second end 28 of the first hinge end piece 20 is adapted to be attached to the attachment zone of an end section of a foldable device (not shown). A second hinge end piece 30 comprises a first end 36 and a second end 38. The first end 36 comprises a cavity 32 adapted to receive the second end 8 of the hinge link means 4 and comprises a pin hole 34 adapted to receive a second hinge link pin 16. The first end 36 of the second hinge end piece 30 also comprises a tapered zone 37 and a substantially flat head 35. The second end 38 of the second hinge end piece 30 is adapted to be attached to the attachment zone of an end section of a foldable device (not shown).

Figure 2:
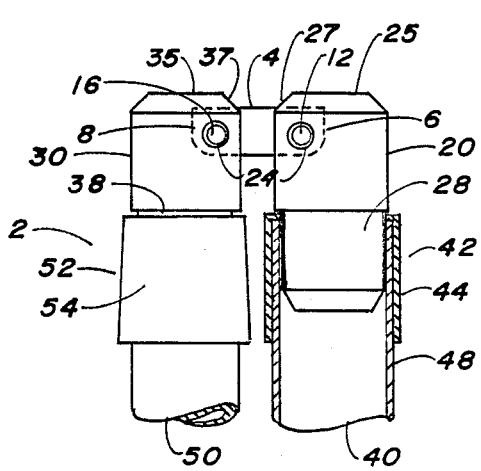
FIG. 2 shows a side view of one variation of a hinge apparatus of this invention in the folded position.

FIG. 2 shows a side view of a portion of the hinge apparatus 2 of this invention when the hinge apparatus 2 is in the folded position. The hinge apparatus 2 couples a first end section 40 of a foldable device with a second end section 50 of a foldable device. The first end section 40 comprises an attachment zone 42. The first end section 40 is shown with a cutaway view of the wall 48 of the attachment zone 40. The second end section 50 comprises an attachment zone 52.

The hinge 2 comprises a first hinge end piece 20 adapted for attachment to the attachment zone 42 of the first end section 40 of a foldable device. The hinge 2 comprises a second hinge end piece 20 adapted for attachment to the attachment zone 52 of the second end section 50 of a foldable device.

A hinge link means 4 comprises a first end 6 and a second end 8. The hinge link means 4 also comprises a first hinge link pin hole (not shown) adapted to receive a first hinge link pin 12 and a second hinge link pin hole (not shown) adapted to receive a second hinge link pin 16. The first hinge end piece 20 comprises a cavity (not shown) adapted to receive the first end 6 of the hinge link means 4 and comprises a pin hole 24 adapted to receive the first hinge link pin 12. The second hinge end piece 30 comprises a cavity (not shown) adapted to receive the second end 8 of the hinge link means 4 and comprises a pin hole (not shown) adapted to receive a second hinge link pin 16.

The second end 28 of the first hinge end piece 20 is inserted into and secured to the attachment zone 42 of the first foldable device end section 40 by a securing means (not shown). In a similar manner, the second end 38 of the second hinge end piece 30 is inserted into and secured to the attachment zone 52 of the second foldable device end section 50 by a securing means (not shown).

An elongated moveable sleeve guide bushing 44 is operably connected to the first end section 40 of the foldable device. In this embodiment, the moveable sleeve guide bushing 44 is substantially cylindrical in shape. An elongated moveable sleeve stop bushing 54 is operably connected to the second end section 52 of the foldable device. In this embodiment, the moveable sleeve stop bushing 54 is substantially frustoconical in shape.

Figure 3:
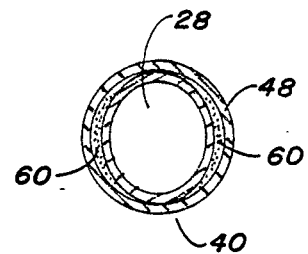
FIG. 3 shows an end view of a tubular variation of a hinge apparatus of this invention.

FIG. 3 is an end view of a portion of a hinge apparatus 2 of this invention. The second end 28 of the first hinge end piece 20 is shown inserted into the first end section 40 of a foldable device. The wall 48 of the end section 40 surrounds the second end 28 of the first hinge end piece 20. In this FIG. 3, the second end 28 of the hinge end piece is not circular but approximates an oval in shape and does not precisely match or fit the substantially circular wall 48 area of the end section 40. A filler 60 is used to fill the void caused by the ovality and prevent movement of the second end section 28 of the hinge end piece within the attachment zone wall area 48.

Figure 4:
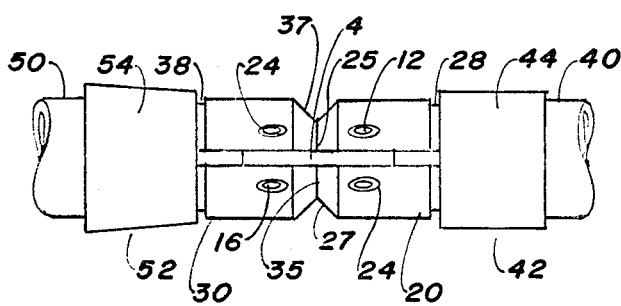
FIG. 4 shows a top view of one variation of a hinge apparatus and assembly of this invention in the use extended position.
Figure 4:
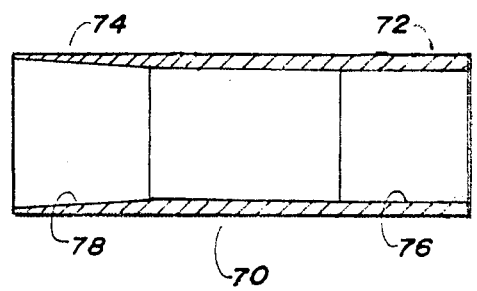

FIG. 4 is a top view of hinge apparatus 2 of this invention in the use extended position. The flat head 25 of the first hinge end piece 20 contacts the flat head 35 of the second hinge end piece 30. An elongated hollow moveable sleeve 70 has a first end 72 and a second end 74. The second end 74 of the hollow moveable sleeve 70 is operably moveable, over the first end section 40 of the foldable device, over the moveable sleeve guide bushing 44, over the first hinge end piece 20, over the second hinge end piece 30, and over the moveable sleeve stop bushing 54, to a rigid use position determined by the contact of the moveable sleeve 70 with the moveable sleeve stop bushing 54 and the moveable sleeve guide bushing 44. In this FIG. 4, a cutaway view of the moveable sleeve 70 is shown. The interior dimension 76 of the first end 72 of the moveable sleeve 70 is substantially cylindrical in shape and is the same as the exterior of the moveable sleeve guide bushing 44. The interior dimension 78 of the second end 74 of the moveable sleeve 70 is substantially inverse frustoconical in shape. In this preferred embodiment as shown, the moveable sleeve 70 has interior dimensions selected so that the sleeve fits tightly around the sleeve stop bushing 54 and the sleeve guide bushing 44.

Figures 5, 6:
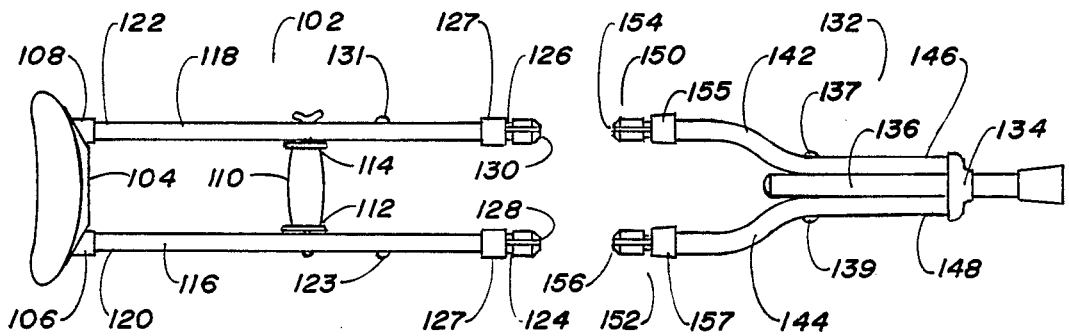
FIG. 5 shows a front view of one variation of a top portion of a folding crutch of this invention.
FIG. 6 shows a front view of one variation of a bottom portion of a folding crutch of this invention.

FIG. 5 shows a front view of a top portion 102 a folding crutch of this invention. The top crutch portion 102 comprises an underarm hold means 104 having a first end 106 and a second end 108, a handle means 110 having a first end 112 and a second end 114, a first top support member 116 and a second top support member 118. The first top support member 116 comprises a first end section 120 and a second end section 124. The second top support member 118 comprises a first end section 122 and a second end section 126. The first end section 120 of the first top support member 116 is operably connected to the first end 106 of the underarm hold means 104 and the first end section 122 of the second top support member 118 is operably connected to the second end 108 of the underarm hold means 104. At a point below the underarm hold means 104, the first top support member 116 is operably connected to the first end 112 of the handle means 110 and the second top support member 118 is operably connected to the second end 114 of the handle means 110. The second end section 124 of the first top support member 116 comprises an attachment zone 128. The second end section 126 of the second top support member 118 also comprises an attachment zone 130. Connected to the lower portion of the first top support member 116 and second top support member 118 are moveable sleeve guide bushings 125 and 127. Latch means 131 and 133 are a part of the top support members.

In FIG. 6, the bottom crutch portion 132 comprises a first bottom support member 142, a second bottom support member 144, a bottom stop means 134, and a brace means 136. The first bottom support member 142 comprises a first end section 146 and a second end section 150. The second bottom support member 144 comprises a first end section 148 and a second end section 152. The first end section 146 of the first bottom support member 142 is operably connected to the bottom stop means 134 and the first end section 148 of the second bottom support member 144 is also operably connected to the bottom stop means 134. At a point above the bottom stop means 134, the first bottom support member 142 is operably connected to the brace means 136 and the second bottom support member 144 is operably connected to the brace means 136. Connecting means 137 and 139, such as screws, may be used for that connection. The second end section 150 of the first bottom support member 142 comprises an attachment zone 154. The second end section 152 of the second bottom support member 144 also comprises an attachment zone 156. Connected to the first bottom support member 142 is a moveable sleeve stop bushing 155. Connected to the second bottom support member 144 is a moveable sleeve stop means 157.

Figure 7:
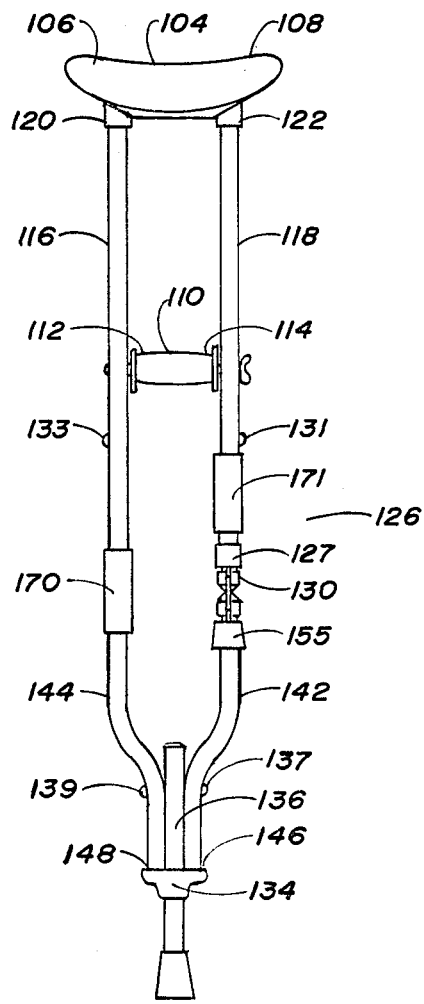
FIG. 7 shows one variation of an assembled folding crutch of this invention in the extended and use position.

FIG. 7 shows one variation of a folding crutch of this invention in the extended use position. In FIG. 7, one moveable sleeve 170 is in a use position resting against the stop bushing (not shown) and a second moveable sleeve 171 is in position permitting folding of the crutch and is not near the sleeve bushing 155. Latch means 131 and 133 are a part of the top support members, which latch means may be used to secure the moveable sleeve in a fixed position when the folding crutch is in a storage position.

Reasonable variations and modifications, which will become apparent to those skilled in the art, can be made in this invention without departing from the spirit and scope thereof.

What is claimed is:

1. A hinge apparatus, for coupling a foldable device comprising a first end section comprising an attachment zone and a second end section comprising an attachment zone, said hinge apparatus comprising:
   a. a first hinge link pin;
   b. a second hinge link pin;
   c. a hinge link means comprising a first end and a second end and a first hinge link pin hole adapted to receive the first hinge link pin and a second hinge link pin hole adapted to receive the second hinge link pin;
   d. a first hinge end piece adapted for attachment to the attachment zone of the first end section of the foldable device, said first hinge end piece comprising a hinge link means cavity adapted to receive the first end of the hinge link means and comprising a hinge link pin hole adapted to receive the first hinge link pin;
   e. a second hinge end piece adapted for attachment to the attachment zone of the second end section of the foldable device, said second hinge end piece comprising a hinge link means cavity adapted to receive the second end of the hinge link means and comprising a hinge link pin hole adapted to receive the second hinge link pin;
   f. a securing means for securing the first hinge end piece to the attachment zone of the first end section of the foldable device;
   g. a securing means for securing the second hinge end piece to the attachment zone of the second end section of the foldable device;
   h. a substantially cylindrical elongated moveable sleeve guide bushing operably connected to the first end section of the foldable device;
   i. a substantially frustoconical shaped elongated moveable sleeve stop bushing operably connected to the second end section of the foldable device, and
   j. an elongated hollow moveable sleeve, having a first end and a second end, wherein when said hinge apparatus of said foldable device is in the use extended position, said second end of the hollow moveable sleeve is operably moveable, over the first end section of the foldable device, over the moveable sleeve guide bushing, over the first hinge end piece, over the second hinge end piece, and over the moveable sleeve stop bushing, to a rigid use position determined by the contact of the moveable sleeve with the moveable sleeve stop bushing and the moveable sleeve guide, wherein the interior dimension of the first end of the moveable sleeve is substantially cylindrical in shape and is the same as the exterior of the substantially cylindrical moveable sleeve guide bushing and the interior dimension of the second end of the hollow moveable sleeve is substantially inverse frustoconical in shape and the elongated hollow moveable sleeve has interior dimensions selected so that the sleeve fits tightly around the stop bushing and the guide bushing and wherein the guide bushing and the stop bushing comprise a composition which permits the guide bushing and the stop bushing to fit tightly within the moveable sleeve.

2. A hinge apparatus in accordance with claim 1 wherein said moveable sleeve has a length sufficient to surround the first hinge end piece and the second hinge end piece and the moveable sleeve stop bushing is adapted to stop the movement of the moveable sleeve at a position over the first hinge end piece and the second hinge end piece.

3. A hinge apparatus in accordance with claim 1 wherein said moveable sleeve guide bushing has a length $L_1$ and has an external dimension $D_1$, wherein said moveable sleeve stop bushing has a length $L_2$ and has a first end and a second end and has a first external dimension $D_2$ at the first end and a second external dimension $D_3$ at the second end, wherein the dimension $D_3$ is greater than the dimension $D_2$, and wherein said moveable sleeve has a length $L_3$, comprising a first end having an internal dimension $D_4$ and second end having an internal dimension $D_5$, wherein the dimension $D_4$ is substantially the same as dimension $D_1$ and the dimension $D_4$ is less than the dimensions $D_2$, $D_3$, and $D_5$, and wherein the dimension $D_5$ is greater than the dimensions $D_1$, $D_2$, $D_3$ and $D_4$, and wherein length $L_3$ is greater than length $L_1$ plus $L_2$.

4. A hinge apparatus in accordance with claim 1 wherein the moveable sleeve guide bushing and the moveable sleeve stop bushing comprise a rigid plastic composition.

5. A hinge apparatus in accordance with claim 1 wherein a filler is used with the attachment zone of the end section of the foldable device and the hinge end piece.

6. A folding crutch comprising:
   a. A top crutch portion comprising an underarm hold means having a first end and a second end, a handle means having a first end and a second end, a first top support member and a second top support member, said first top support member comprising a first end section and a second end section and said second top support member comprising a first end section and a second end section, said first end section of said first top support member being operably connected to the first end of said underarm hold means and said first end section of the second top support member being operably connected to the second end of the underarm hold means, and at a point below the underarm hold means, said first top support member being operably connected to the first end of said handle means and said second top support member being operably connected to the second end of the handle means, wherein the second end section of said first top support member comprising an attachment zone and the second end section of said second top support member comprising an attachment zone;
   b. A bottom crutch portion comprising a bottom stop means, a brace means having a first end and a second end, a first bottom support member and a second bottom support member, said first bottom support member comprising a first end section and a second end section and said second bottom support member comprising a first end section and a second end section, the first end section of said first bottom support member being operably connected to said bottom stop means and the first end section of said second bottom support member being operably connected to said bottom stop means, and at a point above said bottom stop means, said first bottom support member being operably connected to said first end of said brace means and said second bottom support member being operably connected to the second end of said brace means, wherein the second end section of said first bottom support member comprising an attachment zone and the second end section of said second bottom support member comprising an attachment zone; and,
   c. A hinge apparatus connecting said top crutch portion with said bottom crutch portion, providing alternative crutch positions comprising a use extended and secure position wherein said first top support member is axially aligned with said first bottom support member and said second top support member is axially aligned with said second bottom support member and said top support members have positions that are fixed in relation to the positions of said bottom support members and comprising a nonuse folded position wherein said top support members and said bottom support members are not axially aligned and do not have fixed relative positions, said hinge apparatus comprising;
   (1). a first hinge link pin;
   (2). a second hinge link pin;
   (3). a hinge link means comprising a first end and a second end and a first hinge link pin hole adapted to receive the first hinge link pin and a second hinge link pin hole adapted to receive the second hinge link pin;
   (4). a first hinge end piece adapted for attachment to the attachment zone of the first end section of the foldable device, said first hinge end piece comprising a hinge link means cavity adapted to receive the first end of the hinge link means and comprising a hinge link pin hole adapted to receive the first hinge link pin;
   (5). a second hinge end piece adapted for attachment to the attachment zone of the second end section of the foldable device, said second hinge end piece comprising a hinge link means cavity adapted to receive the second end of the hinge link means and comprising a hinge link pin hole adapted to receive the second hinge link pin;
   (6). a securing means for securing the first hinge end piece to the attachment zone of the first end section of the foldable device;
   (7). a securing means for securing the second hinge end piece to the attachment zone of the second end section of the foldable device;
   (8). a substantially cylindrical elongated moveable sleeve guide bushing operably connected to the first end section of the foldable device;
   (9). a substantially frustoconical shaped elongated moveable sleeve stop bushing operably connected to the second end section of the foldable device, and
   (10). an elongated hollow moveable sleeve, having a first end and a second end, wherein when said hinge apparatus of said foldable device is in the use extended position, said second end of the hollow moveable sleeve is operably moveable, over the first end section of the foldable device, over the moveable sleeve guide bushing, over the first hinge end piece, over the second hinge end piece, and over the moveable sleeve stop bushing, to a rigid use position determined by the contact of the moveable sleeve with the moveable sleeve stop bushing and the moveable sleeve guide, wherein the interior dimension of the first end of the moveable sleeve is substantially cylindrical in shape and is the same as the exterior of the substantially cylindrical moveable sleeve guide bushing and the interior dimension of the second end of the hollow moveable sleeve is substantially inverse frustoconical in shape and the elongated hollow moveable sleeve has interior dimensions selected so that the sleeve fits tightly around the stop bushing and the guide bushing and wherein the guide bushing and the stop bushing comprise a composition which permits the guide bushing and the stop bushing to fit tightly within the moveable sleeve.

7. A folding crutch in accordance with claim 6 wherein said moveable sleeve has a length sufficient to surround the first hinge end piece and the second hinge end piece and the moveable sleeve stop bushing is adapted to stop the movement of the moveable sleeve at a position over the first hinge end piece and the second hinge end piece.

8. A folding crutch in accordance with claim 6 wherein said moveable sleeve guide bushing has a length $L_1$ and has an external dimension $D_1$, wherein said moveable sleeve stop bushing has a length $L_2$ and has a first end and a second end and has a first external dimension $D_2$ at the first end and a second external dimension $D_3$ at the second end, wherein the dimension $D_3$ is greater than the dimension $D_2$, and wherein said moveable sleeve has a length $L_3$, comprising a first end having an internal dimension $D_4$ and second end having an internal dimension $D_5$, wherein the dimension $D_4$ is substantially the same as dimension $D_1$ and the dimension $D_4$ is less than the dimensions $D_2$, $D_3$, and $D_5$, and wherein the dimension $D_5$ is greater than the dimensions $D_1$, $D_2$, $D_3$ and $D_4$, and wherein length $L_3$ is greater than length $L_1$ plus $L_2$.

9. A folding crutch in accordance with claim 6 wherein the moveable sleeve guide bushing and the moveable sleeve stop bushing comprise a rigid plastic composition.

10. A folding crutch in accordance with claim 6 wherein a filler is used with the attachment zone of the end section of the foldable device and the hinge end piece.

11. A folding crutch in accordance with claim 6 wherein the brace means comprises a hinge apparatus.

* * * * *